UNITED STATES PATENT OFFICE.

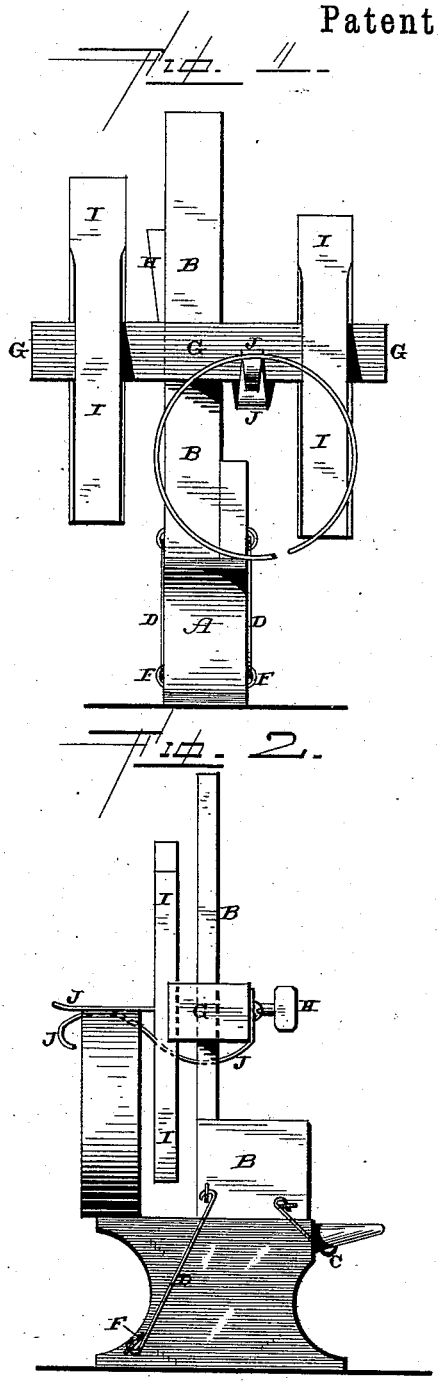

WILLIAM WEBSTER, OF JONESVILLE, SOUTH CAROLINA.

TIRE APPLIANCE FOR ANVILS.

SPECIFICATION forming part of Letters Patent No. 373,869, dated November 29, 1887.

Application filed March 15, 1886. Renewed July 7, 1887. Serial No. 243,635. (No model.)

*To all whom it may concern:*

Be it known that I, WILLIAM WEBSTER, of Jonesville, in the county of Union and State of South Carolina, have invented certain new and useful Improvements in Tire-Machines; and I do hereby declare the following to be a full, clear, and exact description of the invention, such as will enable others skilled in the art to which it pertains to make and use it, reference being had to the accompanying drawings, which form part of this specification.

My invention relates to an improvement in tire-machines; and it consists in the combination, with an anvil, of a suitable standard or support which is detachably connected therewith, and which is provided with a vertically-adjustable slide carrying a suitable holding device which holds the tire, and suitable vertical braces or supports, as will be more fully described hereinafter.

The object of my invention is to apply to anvils a suitable attachment whereby the tire can be held in position while it is being operated upon for any purpose, and thus enabling the help of an extra hand for holding the tire to be entirely dispensed with.

Figure 1 is a front elevation of a machine embodying my invention. Fig. 2 is a side elevation of the same.

A represents an ordinary anvil, and B the standard, frame, or support, which is to be rigidly connected thereto whenever the blacksmith wishes to operate upon a tire for any purpose. This standard or frame is fastened to the anvil by means of the bail C, which catches under the horn of the anvil, and the two hooked rods or catches D, which engage at their lower ends with staples F or other similar devices, which are formed upon or fastened to the anvil in any manner.

The frame B is made largest at its bottom, so as to form a solid support, and which has that portion upon which the slide G moves to extend vertically upward to any desired height. This slide G has an opening through it near its center, so that it can freely slide up and down upon the frame, and is secured in any desired position by means of a set-screw or other suitable holding device, H. This slide is made vertically adjustable upon the frame or standard for the purpose of adjusting it to the kind of work that is to be done and to the size of the tire which is to be operated upon. In the front edge of this slide are made suitable dovetailed grooves, in which are placed the vertical braces I, which have their edges so shaped as to fit in the dovetailed openings made to receive them. These vertical braces I serve as supports to the tire, so as to prevent it from twisting around while it is being operated upon. For the purpose of supporting the tire in an upright position while it is being operated upon by the blacksmith a suitable spring-catch, J, is attached to the slide, and by means of which catch the tire is held ready for the blacksmith to operate upon it.

By means of the construction here shown and described all necessity for a person to hold the tire upon the anvil while the blacksmith operates upon it is entirely dispensed with, thus cheapening the cost of the tire or any work that may be done upon it. After the tire has been finished, the attachment or machine can be removed from the anvil and the latter be free to be used in the usual manner.

Having thus described my invention, I claim—

1. The combination of the anvil, the frame or standard connected thereto, the vertically-moving slide, and a catch or sliding device for holding the tire in a vertical position, substantially as shown.

2. The combination of the anvil, the frame or standard connected thereto, the vertically-moving slide provided with a catch for holding the tire, and the vertical braces which are connected to the slide, substantially as described.

3. The combination of the anvil, the bail for catching over the horn of the anvil, the hooks or catches, with the frame or standard, the vertically-adjustable slide provided with a holding device for the tire, and the vertical braces, substantially as set forth.

In testimony whereof I affix my signature in presence of two witnesses.

WILLIAM WEBSTER.

Witnesses:
P. P. WILLIAMS,
H. C. SMITH.